(12) United States Patent
Vogel

(10) Patent No.: US 12,523,838 B2
(45) Date of Patent: Jan. 13, 2026

(54) NETWORK ARCHITECTURE USING INDEXING AND TAPPING MODULES

(71) Applicant: CommScope Technologies LLC, Hickory, NC (US)

(72) Inventor: Mark O. Vogel, Statesvlle, NC (US)

(73) Assignee: CommScope Technologies LLC, Claremont, NC (US)

( * ) Notice: Subject to any disclaimer, the term of this patent is extended or adjusted under 35 U.S.C. 154(b) by 219 days.

(21) Appl. No.: 18/007,298

(22) PCT Filed: Jul. 29, 2021

(86) PCT No.: PCT/US2021/043629
§ 371 (c)(1),
(2) Date: Jan. 27, 2023

(87) PCT Pub. No.: WO2022/026656
PCT Pub. Date: Feb. 3, 2022

(65) Prior Publication Data
US 2023/0280547 A1    Sep. 7, 2023

Related U.S. Application Data

(60) Provisional application No. 63/058,760, filed on Jul. 30, 2020.

(51) Int. Cl.
*G02B 6/36*    (2006.01)
*G02B 6/44*    (2006.01)
*H04J 14/02*   (2006.01)

(52) U.S. Cl.
CPC ....... *G02B 6/4472* (2013.01); *G02B 6/44465* (2023.05); *G02B 6/44528* (2023.05); *H04J 14/0215* (2013.01)

(58) Field of Classification Search
CPC .............. G02B 6/4472; G02B 6/44465; G02B 6/44528; G02B 6/36; H04J 14/0205
See application file for complete search history.

(56) References Cited

U.S. PATENT DOCUMENTS

| | | | |
|---|---|---|---|
| 6,928,215 B1 * | 8/2005 | Lui | G02B 6/26 385/39 |
| 9,207,421 B2 | 12/2015 | Conner | |
| 9,348,096 B2 | 5/2016 | Kmit et al. | |
| | (Continued) | | |

FOREIGN PATENT DOCUMENTS

| | | |
|---|---|---|
| EP | 1981185 A1 | 10/2008 |
| JP | H1032545 A | 2/1998 |
| WO | 2018085397 A1 | 5/2018 |

OTHER PUBLICATIONS

International Search Report for International Patent Application No. PCT/US2021/043629 mailed Nov. 26, 2021.

*Primary Examiner* — Jennifer Doan
(74) *Attorney, Agent, or Firm* — Merchant & Gould P.C.

(57) ABSTRACT

Indexing modules and tapping modules that can be interconnected in one or more chains to form a network. The indexing modules each include at least one pass-through line that is not dropped or indexed at the indexing module. The tap modules each include a tap line and a pass-through line. Input and pass-through connection interfaces of the indexing and tapping modules are configured so that the tap line of the tap modules is connected only to the pass-through line of the indexing modules.

6 Claims, 12 Drawing Sheets

(56) References Cited

U.S. PATENT DOCUMENTS

| | | |
|---|---|---|
| 10,033,463 B2 | 7/2018 | Hubbard et al. |
| 10,151,897 B2 | 12/2018 | Gronvall et al. |
| 10,678,013 B2 | 6/2020 | Marcouiller |
| 2012/0263415 A1 | 10/2012 | Tan et al. |
| 2015/0093073 A1 | 4/2015 | Wright |
| 2015/0288449 A1* | 10/2015 | Coffey ............. H04B 10/25891 398/141 |
| 2017/0346553 A1 | 11/2017 | Rhoney et al. |
| 2020/0200982 A1 | 6/2020 | Dowling et al. |

* cited by examiner

NETWORK ARCHITECTURE USING INDEXING AND TAPPING MODULES

CROSS-REFERENCE TO RELATED APPLICATION

This application is a national stage entry of PCT International Patent Application PCT/US2021/043629 filed on Jul. 29, 2021 and claims the benefit of U.S. Patent Application Ser. No. 63/058,760, filed on Jul. 30, 2020, the disclosure of which is incorporated herein by reference in its entirety.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

SUMMARY

Some aspects of the disclosure are directed to indexing and tapping modules that can be intermixed in a network while dropping only untapped optical signals at the indexing modules.

Each indexing module receives a plurality of optical lines at an input, passes through at least one optical lines from the input to a pass-through connection interface, drops one or more of the lines from the input to one or more drop output connection interfaces, and indexes a remainder of the lines from the input to the pass-through connection interface. Some implementations of the indexing modules drop only unsplit optical signals. Other implementations of the indexing modules include optical power splitters and drop split optical signals. In certain implementations, the indexing modules drop both split and unsplit optical signals.

The tap modules include at least one tap line from which optical signals are tapped and carried to a drop connection interface. The tap line continues to a pass-through connection interface. In certain implementations, the tap modules also include pass-through lines that carry optical signals through the tap modules to the pass-through connection interface without tapping or splitting the optical signals carried thereon.

In certain implementations, the input and pass-through connection interfaces are configured so that the tap lines of the tap modules optically couple to the pass-through lines of the indexing modules regardless of the configuration of the indexing modules and tapping modules.

In certain implementations, each of the indexing modules and the tap modules have a multi-fiber input, a multi-fiber pass-through output, and at least one drop output. The drop output can be single-fiber or multi-fiber. The drop output can be one of multiple drop outputs.

In certain implementations, the number of optical fibers extending along the network tapers off as the optical lines pass through the indexing modules. In certain examples, the number of optical fibers received at an input connection interface of an indexing module may be larger than the number of optical fibers received at a pass-through connection interface of the indexing module. In some examples, a plug connector at the input connection interface may have a greater number of sequential fiber positions compared to a plug connector at the pass-through connection interface. In other examples, plug connectors at the input and pass-through connection interface may have a common number of fiber positions, but some of the fiber positions of the plug connector at the pass-through connection interface remain empty.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
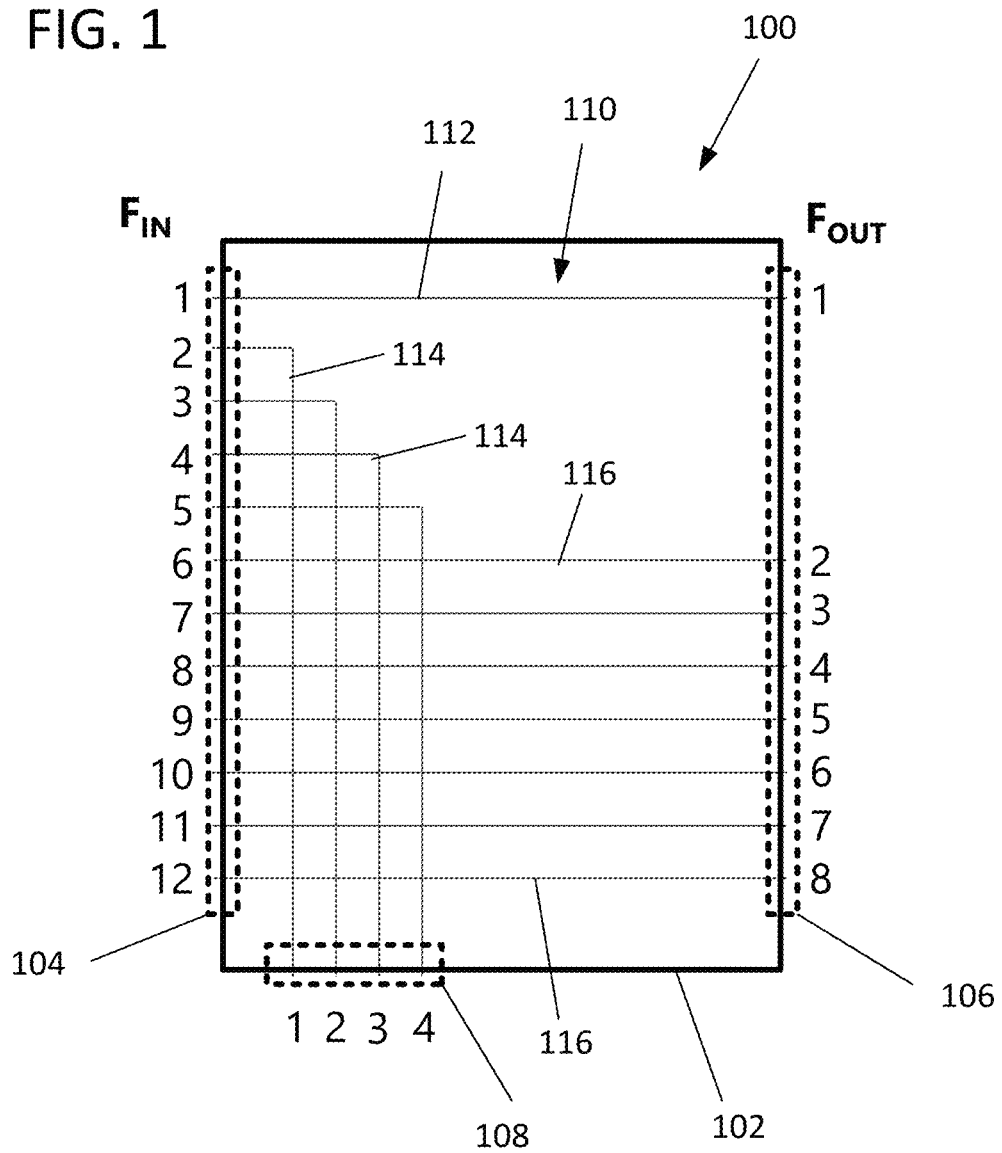
FIG. 1 is a schematic view of an example indexing module for use in an optical network, the indexing module including a pass-through fiber, at least one drop fiber, and at least one indexed fiber.

Reference will now be made in detail to exemplary aspects of the present disclosure that are illustrated in the accompanying drawings. Wherever possible, the same reference numbers will be used throughout the drawings to refer to the same or like parts.

The present disclosure is directed to a fiber optic system including a plurality of module types that can be mixed and matched to create a fiber optic network. The fiber optic system includes a first type of module 100, referred to as an indexing module, and a second type of module 150, referred to as a tap module. The optical network can be formed by optically coupling together one or more of the indexing modules 100 and one or more of the tap modules 150 into one or more chains.

Each of the types of modules 100, 150 includes a housing 102, 152 having a first multi-fiber demateable connection interface 104, 154 and a second multi-fiber demateable connection interface 106, 156 that provide an input and a pass-through output, respectively. In certain examples, one or more of the multi-fiber demateable connection interfaces 104, 154, 106, 156 include adapter ports. In certain examples, one or more of the multi-fiber demateable connection interfaces 104, 154, 106, 156 include connectorized ends of stub cables extending outwardly from the housing 102, 152. Each of the types of modules 100, 150 also includes one or more demateable connection interfaces 108, 158 that provide one or more split signal outputs.

In some implementations, the demateable connection interfaces of the various modules 100, 120, 150 can be hardened (i.e., ruggedized). A hardened demateable connection interface is configured to be environmentally sealed and robustly fastened to a mating demateable connection interface. For example, a hardened plug connector may carry an environmental seal and may include a twist-to-lock fastener (e.g., a threaded fastener, a bayonet fastener, etc.). A hardened adapter port may include a sealing surface against which the environmental seal of the plug connector presses. Alternatively, the hardened adapter port may carry the seal while the plug connector has the sealing surface. A hardened adapter port may include mating structure for a twist-to-lock fastener. Suitable examples of hardened demateable connection interfaces are shown and described in U.S. Pat. No. 9,348,096, the disclosure of which is hereby incorporated herein by reference in its entirety.

In certain implementations, each of the multi-fiber demateable connection interfaces 104, 154, 106, 156 defines a plurality of sequential fiber positions. In some examples, the first and second multi-fiber demateable connection interfaces 104, 154, 106, 156 have a common number of sequential fiber positions (e.g., two, four, six, eight, ten, twelve, sixteen, twenty-four, etc.). In other implementations, the number of sequential fiber positions tapers off along the chain. For example, the number of sequential fiber positions of the first multi-fiber demateable connection interface 104, 154 is equal to the sum of the sequential fiber positions of the second multi-fiber demateable connection interface 106, 156 and the fiber positions of any split signal output demateable connection interface 108, 158.

FIG. 1 illustrates an example indexing module 100 including internal fiber circuitry 110. The internal fiber circuitry 110 includes a pass-through fiber 112, one or more drop fibers 114, and one or more indexed fibers 116. The pass-through fiber 112 extends between corresponding fiber positions (e.g., the first fiber positions) of the sequential fiber positions of the first and second multi-fiber demateable connection interfaces 104, 106 so that the pass-through fiber 112 is not indexed along the sequential fiber positions between the interfaces 104, 106. The drop fiber 114 extends between a second fiber position of the first multi-fiber demateable connection interface 104 and a third demateable connection interface 108. The indexed fiber 116 is indexed along the sequential fiber positions between the first and second multi-fiber demateable connection interfaces 104, 106.

In one implementation, the internal fiber circuitry 110 of the indexing module 100 includes a single drop fiber 114 that extends to a single-fiber demateable connection interface (e.g., an adapter port or a plug connector). In other implementations, however, the internal fiber circuitry 110 includes multiple drop fibers 114. In some examples, each of the drop fibers 114 is routed to a respective single-fiber demateable connection interface 108. In other examples, two or more of the drop fibers can be routed to a multi-fiber demateable connection interface 108. In the example depicted in FIG. 1, all of the drop fibers 114 are routed to the third demateable connection interface 108.

In certain implementations, each indexing module 100 in a network is configured so that the pass-through fiber 112 is disposed at a common position at the first and second multi-fiber demateable connection interfaces 104, 106. Accordingly, when two or more of the indexing modules 100 are optically coupled together end-to-end (i.e., the first multi-fiber demateable connection interface 104 of an indexing module 100 is optically coupled to the second multi-fiber demateable connection interface 106 of another indexing module 100), the pass-through fibers 112 all optically couple together along a common pass-through line (e.g., see line 1 in the network 200 of FIG. 6).

Figure 2:
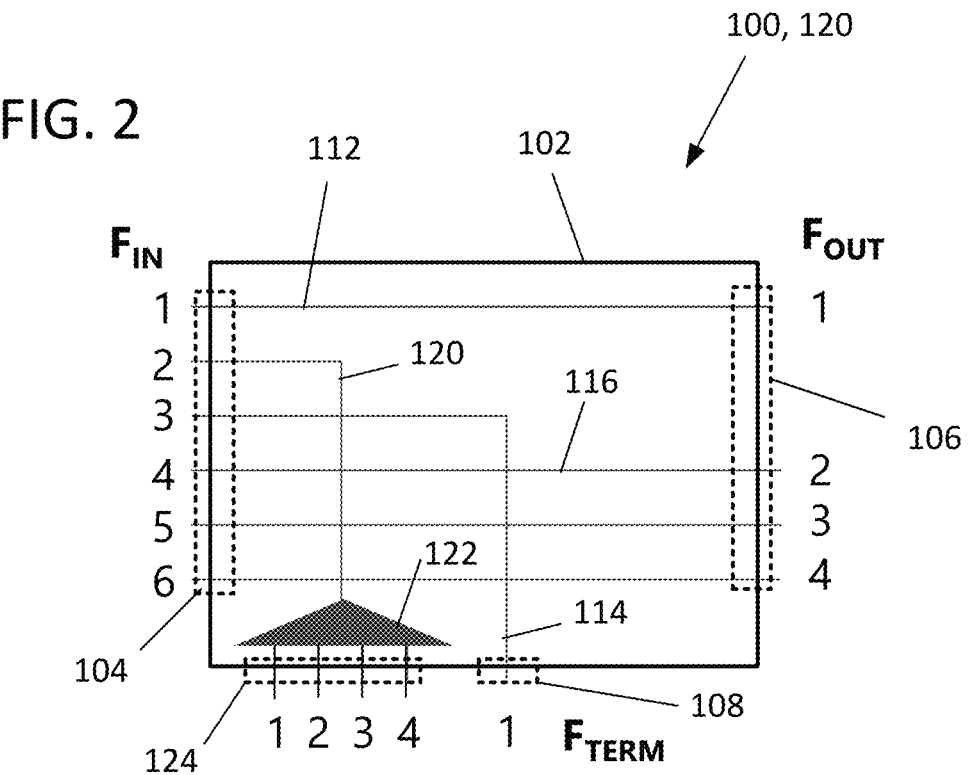
FIG. 2 is a schematic view of an example splitter indexing module for use in the optical network, the splitter indexing module being substantially the same as the indexing module of FIG. 1 except that one of the drop fibers is routed to an internal splitter within the module.

FIG. 2 illustrates a variation 120 on an indexing module 100 that includes an optical splitter 122 (e.g., a passive optical power splitter, a wave division multiplexer, etc.) disposed within the housing 102. The alternative indexing module 120 still includes the housing 102 having first and second multi-fiber demateable connection interfaces 104, 106. The alternative indexing module 120 also includes internal fiber circuitry 110 including a pass-through fiber 112 and at least one indexed fiber 116.

The alternative indexing module 120 differs from the indexing module 100 of FIG. 1 in that the internal circuitry 110 also includes a drop fiber 120 routed to an input of the optical splitter 122 disposed within the housing 102. The optical splitter 122 splits optical signals carried over the drop fiber 120 onto multiple splitter outputs routed to one or more demateable connection interfaces 124. In the depicted example, all of the splitter outputs are routed to a multi-fiber demateable connection interface 124. In other examples, however, the splitter outputs can be routed to multiple demateable connection interfaces (e.g., single-fiber connection interfaces, duplex fiber connection interfaces, etc.).

In certain implementations, the internal circuitry 110 also includes at least one drop fiber 114 that bypasses the optical splitter 122. In some examples, the bypass drop fiber 114 is routed to a third demateable connection interface 108 that is separate from the demateable connection interface 124 receiving the splitter outputs. In other examples, the bypass drop fiber 114 can be routed to the same demateable connection interface as the splitter outputs. In certain examples, the drop fibers 114, 120 extend from the same fiber positions of the first multi-fiber demateable connection interface 104 of each indexing module 100, 120 in the system. In the depicted example, the drop fiber 120 routed to the splitter 122 extends from the second fiber position of the first multi-fiber demateable connection interface 104 and the bypass drop fiber 114 extends from the third fiber position of the first multi-fiber demateable connection interface 104.

Figure 3:
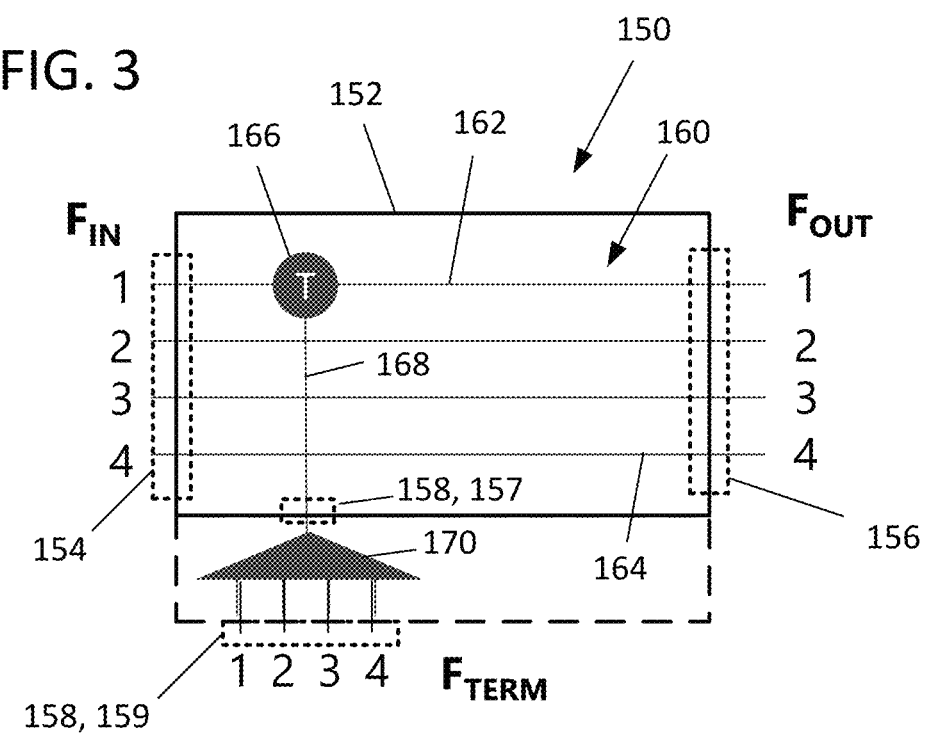
FIG. 3 is a schematic view of an example tapping module for use in any of the optical networks disclosed herein, the tapping module including a tapped optical fiber and one or more pass-through fibers.

FIG. 3 illustrates an example tap module 150 including internal fiber circuitry 160. The internal fiber circuitry 160 includes a tapped fiber 162 that extends between corresponding fiber positions (e.g., the first fiber positions) of the first and second multi-fiber demateable connection interfaces 154, 156. The internal fiber circuitry 160 also includes one or more pass-through fibers 164 that extends between the other (e.g., subsequent) fiber positions of the first and second multi-fiber demateable connection interfaces 154, 156.

The internal fiber circuitry 160 also includes an optical tap 166 that splits optical signals carried over the tapped fiber 162 onto an output fiber 168 that is optically coupled to the third demateable connection interface 158. All of the pass-through fiber 164 bypass the optical tap 166 so that no optical signals are split from any of the pass-through fibers 164 between the first and second multi-fiber demateable connection interfaces 154, 156. As the term is used herein, an optical power splitter evenly splits the signal power between the splitter outputs. In contrast, as the term is used herein, an optical tap unequally splits the signal power. In particular, a majority of the optical signals continues along the tapped fiber 162 while a percentage of the optical signal is directed to the output fiber 168.

In some implementations, the demateable connection interface 158 is a single-fiber demateable connection interface 157 that directly receives the output fiber 168. In other implementations, the tap module 150 also includes an optical splitter 170 within the housing 152. In such examples, the output fiber 168 is routed to an input of the optical splitter 170. Splitter outputs of the optical splitter 170 are routed to one or more demateable connection interfaces 158. For example, the demateable connection interface 158 can be a multi-fiber demateable connection interface 159 that receives two or more of the splitter outputs. In the depicted example, all of the splitter outputs are routed to the demateable connection interface 158, 159.

In certain implementations, each tap module 150 within a network is configured so that the tapped fiber 162 is disposed at a common position at the first and second multi-fiber demateable connection interfaces 154, 156. Accordingly, when two or more of the tap modules 150 are optically coupled together end-to-end (i.e., the first multi-fiber demateable connection interface 154 of a tap module 150 is optically coupled to the second multi-fiber demateable connection interface 156 of another tap module 150), the tapped fibers 162 all optically couple together along a common tap line (e.g., see line 1 of the network 240 of FIG. 10).

In some implementations, the optical fibers are indexed by the indexing modules 100 and/or splitter indexing modules 120 in a first direction along the chain. In other implementations, the optical fibers can be indexed in a first direction moving downstream along the chain and can be indexed in an opposite second direction moving upstream along the chain. Examples of a bidirectional indexing network are shown and described in U.S. Pat. No. 9,348,096, the disclosure of which is incorporated by reference above. In some examples, the optical network is a ring-type network that begins and ends at a central office or other signal source. Such networks work well for bidirectional indexing. In other implementations, the optical network is a cascade or chain network beginning at a central office or other signal source and ending at various subscribers. Such networks work well for single direction indexing.

In some implementations, the tapping modules 150 may include multiple tapped fibers. In such implementations, however, the indexing modules 100 and splitter indexing modules 120 of the same system must have multiple pass-through fibers that correspond with the sequential fiber positions of the tapped fibers. Accordingly, the tapping modules 150, indexing modules 100, and splitter indexing modules 120 can be used in any desired configuration within a network without unintentionally dropping the tapped fiber lines (i.e., the lines carrying the optical signals of reduced power).

Figure 4:
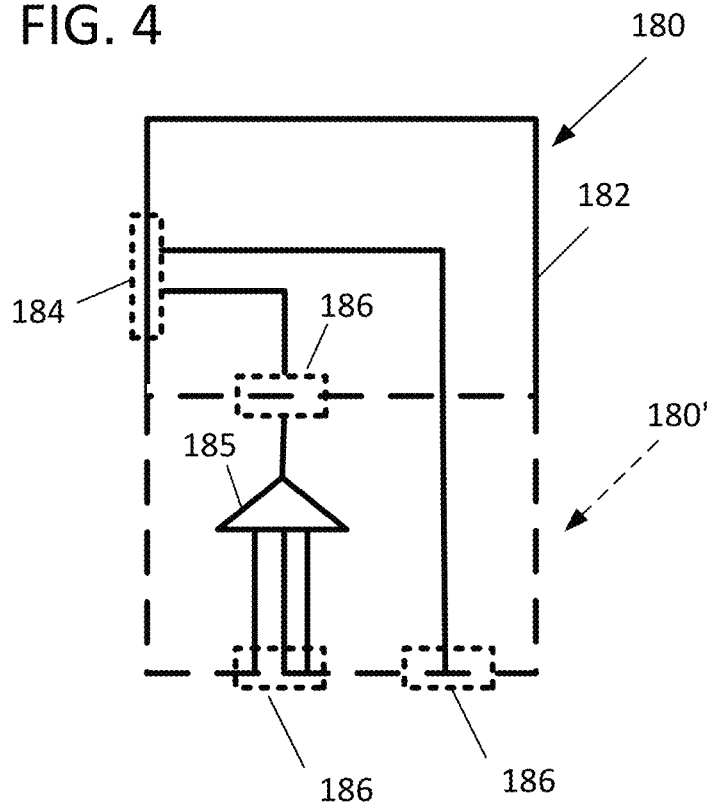
FIG. 4 is a schematic view of an example first completer module suitable for use at the end of a network utilizing the modules disclosed herein.
Figure 5:
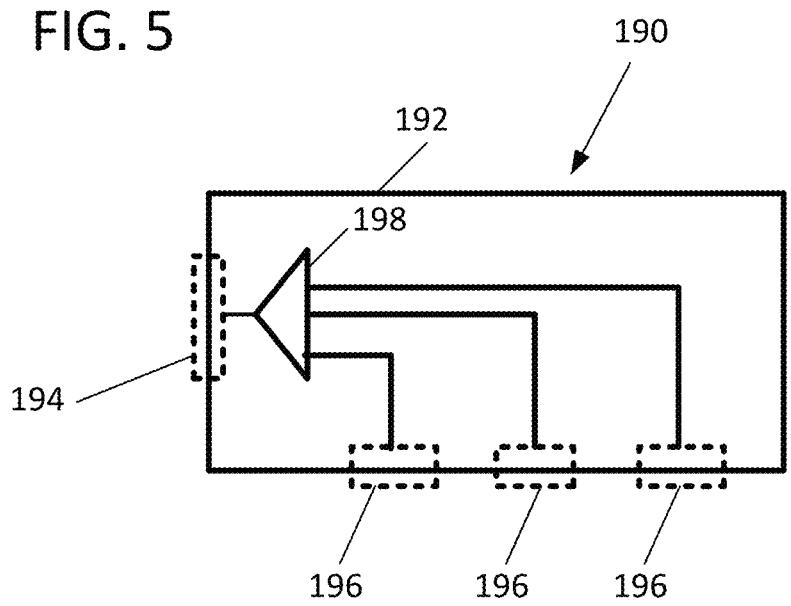
FIG. 5 is a schematic view of an example second completer module suitable for use along the network utilizing the modules disclosed herein.

FIGS. 4 and 5 shows examples of completer type modules 180, 190 that can be used at the end of the optical networks to complete a network chain or cascade. Each completer module 180, 190 includes a housing 182, 192 having an input demateable connection interface 184, 194 and one or more output demateable connection interfaces 186, 196. As the term is used herein, a completer module refers to a module in which the optical fiber at the first fiber position of the first demateable connection interface (or input demateable connection interface) is routed to an output demateable connection interface (e.g., a single-fiber demateable connection interface) instead of passed through the module to a pass-through output (e.g., a multi-fiber demateable connection interface that is separate from an output demateable connection interface).

FIG. 4 shows a first completer module 180 that functions as a fanout module. The input demateable connection interface 184 of the first completer module 180 is a multi-fiber demateable connection interface to receive multiple optical fibers. The first completer module 180 includes internal fiber circuitry that routes each of the optical fibers from the input demateable connection interface 184 to an output demateable connection interface 186. In some examples, each optical fiber is routed to a separate single-fiber demateable connection interface 186. In other examples, multiple ones of the optical fibers can be routed to a multi-fiber (e.g., duplex) demateable connection interface 186. In certain implementations, optical signals carried over the optical fibers are not split between the input demateable connection interface 184 and the output demateable connection interface 186. It will be understood that the first completer module 180 can be optically coupled to a multi-fiber demateable connection interface (e.g., the second demateable connection interface 106, 156) of any of the modules 100, 120, 150.

In certain implementations, an alternative first completer module 180' also includes an optical splitter 185 that receives input from one of the optical fibers. Accordingly, the alternative first completer module 180' has the same output configuration as the splitter indexing modules 120. The optical splitter 185 is disposed within the module housing. Outputs of the splitter 185 are routed to one or more demateable connection interfaces (e.g., single-fiber interfaces or multi-fiber interfaces) 186.

FIG. 5 shows a second completer module 190 that functions as a splitter module. The input demateable connection interface 194 of the second completer module 190 is a single-fiber demateable connection interface to receive a single optical fiber. The second completer module 190 includes internal fiber circuitry that routes the optical fiber from the input demateable connection interface 194 to an optical splitter 198 at which optical signals carried over the optical fiber are split onto splitter output fibers routed to the output demateable connection interfaces 196. In some examples, each splitter output is routed to a separate single-fiber demateable connection interface 196. In other examples, multiple ones of the splitter outputs (e.g., some or all) can be routed to a multi-fiber demateable connection interface 196. It will be understood that the second completer module 190 can be optically coupled to a single-fiber demateable connection interface (e.g., the third demateable connection interface 108, 157) of any of the modules 100, 120, 150.

In accordance with aspects of the present disclosure, the fiber position of the tapped fiber 162 of the tap module 150 in a fiber optic system matches the fiber position of the pass-through fiber 112 of the indexing module 100, 120 in the fiber optic system. Accordingly, no matter how the indexing modules 100, 120 and tapped modules 150 are arranged within the network, optical power will always be tapped from the same fiber and that fiber will not be dropped at the indexing modules 100, 120. This principles is illustrated in FIGS. 6-12, which depict various example network configurations implemented using the indexing type modules 100, 120 and tap type module 150. For ease in viewing, the first and second multi-fiber demateable connection interfaces 104, 106, 154, 156 of the modules 100, 120, 150 are not depicted. Rather, dashed lines show connections between the internal circuitries 110, 160 of the modules 100, 120, 150.

It will be understood that the second demateable connection interface of an indexing module is connected to the first demateable connection interface of the subsequent indexing module in a chain. In some examples, both the first and second demateable connection interfaces include adapter ports. In such examples, a cable extends between the second connection interface of an indexing module and the first connection interface of the subsequent indexing module to form the connection. In other examples, one of the first and second connection interfaces is a connectorized end of a stub cable that extends to an adapter port defined by the other of the first and second connection interface to form the connection.

Figure 6:
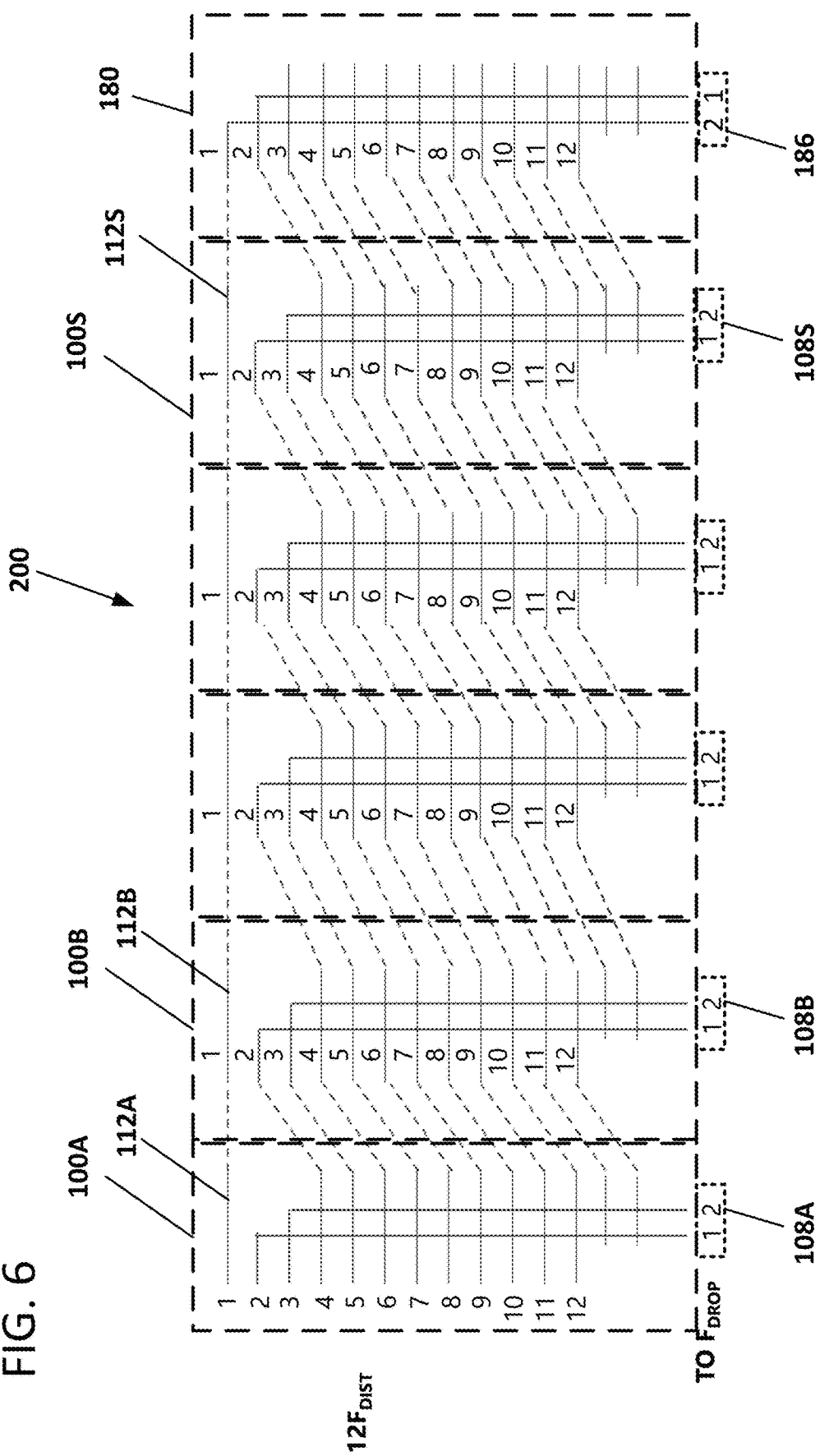
FIG. 6 is a schematic view of a first example network formed from five of the indexing modules of FIG. 1 and one of the first completer modules of FIG. 4, the modules of FIG. 6 having input and pass-through connection interfaces with a constant number of fiber positions.

FIG. 6 illustrates an example network 200 implemented using multiple ones of the indexing modules 100 and the first completer module 180. In the network 200, the optical fibers at the second and third fiber positions of the first multi-fiber demateable connection interface drop to a third demateable connection interface 108A. A pass-through fiber 112A extends between the first fiber positions of the first and second multi-fiber demateable connection interfaces. The remaining fibers are indexed between the first and second demateable connection interfaces (e.g., the optical fiber at the fourth fiber position of the first demateable connection interface is routed to the second fiber position of the second demateable connection interface).

In the second indexing module 100B, the optical fibers at the second and third fiber positions of the first multi-fiber demateable connection interface drop to a third demateable connection interface 108B; a pass-through fiber 112B extends between the first fiber positions of the first and second demateable connection interfaces; and the remaining fibers are indexed between the first and second demateable connection interfaces. Accordingly, the pass-through fiber 112A of the first indexing module 100A is optically coupled to the pass-through fiber 112B of the second indexing module 100B while two of the indexed optical fibers of the first indexing module 100A are dropped at the second indexing module 100B.

The example network 200 continues in this fashion to the final indexing module 100S in the chain. In the final indexing module 100S, the optical fibers at the second and third fiber positions of the first multi-fiber demateable connection interface drop to a third demateable connection interface 108S; a pass-through fiber 112S extends between the first fiber positions of the first and second demateable connection interfaces; and the remaining fibers are indexed between the first and second demateable connection interfaces. Accordingly, the pass-through fiber 112A of the first indexing module 100A is optically coupled to the pass-through fiber 112S of the final indexing module 100S while another two of the indexed optical fibers of the first indexing module 100A are dropped at the final indexing module 100S.

In the example network 200, the second demateable connection location of the final indexing module 100S is coupled to the input demateable connection interface 184 of the first completer module 180. In particular, the input 184 of the first completer module 180 receives the pass-through fiber 112S and one of the indexed fibers of the final indexing module 100S. The first completer module 180 routes both fibers to one or more outputs 186 of the first completer module 180.

In some implementations, the number of optical fiber positions of the first and second demateable connection interfaces remain constant along the network. In single direction indexing networks, an increasing number of fiber positions may receive dead fibers or be unfilled as the network progresses. In other implementations, however, the fiber positions may taper off between the first and second demateable connection interfaces of the modules. For example, the number of cables passed through the chain can be reduced by the number of cables dropped along the chain. Tapering off the fiber positions allows smaller fiber count cables to be used at subsequent connections within the network, which may reduce cost.

Figure 7:
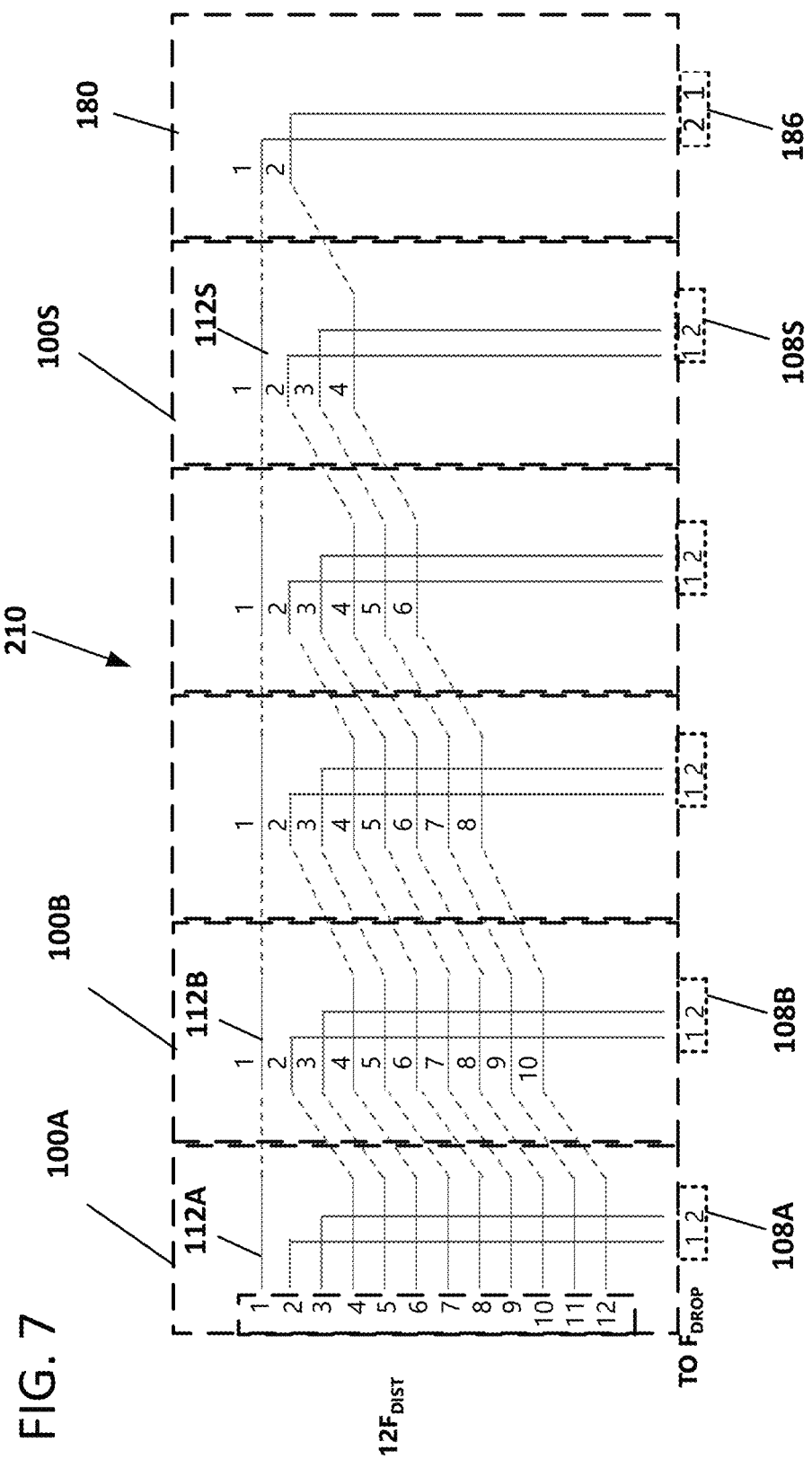
FIG. 7 is a schematic view of a second example network that is substantially the same as the first network of FIG. 6 except the number of sequential fiber positions tapers off at each module along the chain.

FIG. 7 illustrates another example network 210 that is substantially the same as the network 200 shown in FIG. 6 except that the fiber positions taper off between indexing modules 100 in the chain. Accordingly, the first multi-fiber demateable connection interface of the first indexing module 100A in the chain receives twelve optical fibers while the second multi-fiber demateable connection interface receives ten optical fibers. A pass-through fiber 112A extends between the first fiber positions of both first and second connection interfaces. The indexed fibers fill the rest of the fiber positions of the second connection interface. Accordingly, all of the fiber positions of the second connection interface are filled with live fibers.

The first multi-fiber demateable connection interface of the subsequent indexing module 100B has a common number of fiber positions with the second multi-fiber demateable connection interface of the indexing module 100A. The example network 210 continues in this fashion to the final indexing module 100S in the chain. The final indexing module 100S has a first demateable connection interface that defines four fiber positions and a second demateable connection interface that defines two fiber positions. The pass-through fiber 112S and last indexed fiber of the final indexing module 100S are passed to the first completer module 180 as described above with respect to FIG. 6.

Figure 8:
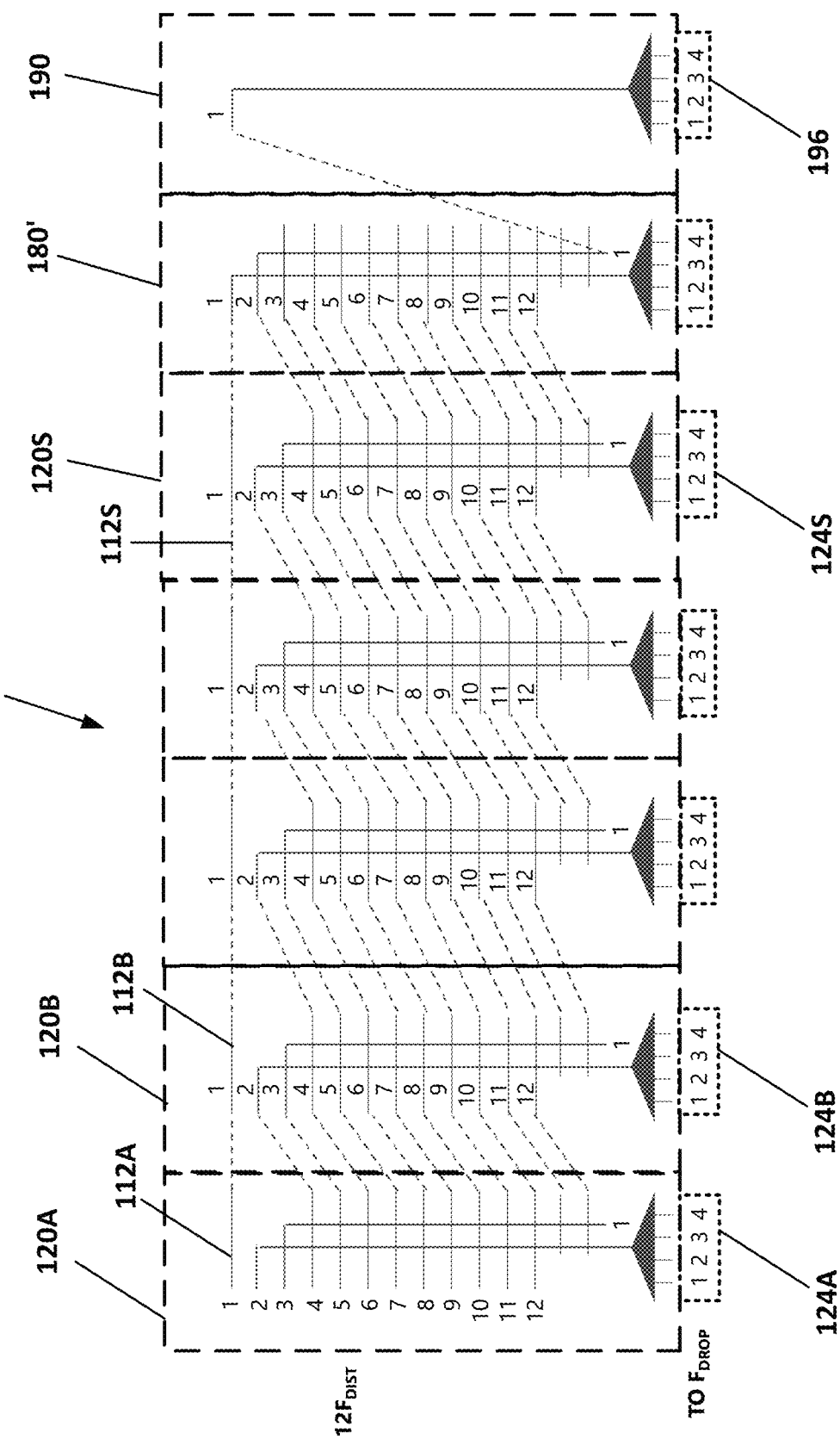
FIG. 8 is a schematic view of a third example network formed from five splitter indexing modules of FIG. 2, one first completer module of FIG. 4, and a second completer module of FIG. 5.

FIG. 8 illustrates another example network 220 including a chain of indexing splitter type modules 120 and a second completer module 190. In the example shown, the first and second demateable connection interfaces of the indexing splitter modules 120 have a common number of optical fibers. It will be understood, however, that the fiber count can alternatively taper off along the network as shown in network 210 of FIG. 7.

In the network 220, the optical fibers at the second fiber positions of the first multi-fiber demateable connection interfaces drop to optical splitters 122 within the indexing splitter modules 120. The splitter outputs are routed to one or more demateable connection interfaces 124. The optical fibers at the third fiber positions of the first multi-fiber demateable connection interfaces drop to third demateable connection interfaces (e.g., demateable connection interfaces 108). A pass-through fiber 112A extends between the first fiber positions of the first and second multi-fiber demateable connection interfaces. The remaining fibers are indexed between the first and second demateable connection interfaces.

In the second indexing module 120B, the optical fibers at the second and third fiber positions of the first multi-fiber demateable connection interface drop to a splitter 120 and third demateable connection interface; a pass-through fiber 112B extends between the first fiber positions of the first and second demateable connection interfaces; and the remaining fibers are indexed between the first and second demateable connection interfaces. Accordingly, the pass-through fiber 112A of the first indexing module 120A is optically coupled to the pass-through fiber 112B of the second indexing module 120B while two of the indexed optical fibers of the first indexing module 120A are dropped at the second indexing module 120B.

The example network 220 continues in this fashion to the final indexing module 120S in the chain. In the final indexing module 120S, the optical fibers at the second and third fiber positions of the first multi-fiber demateable connection interface drop to splitter 122 and demateable connection interface; a pass-through fiber 112S extends between the first fiber positions of the first and second demateable connection interfaces; and the remaining fibers are indexed between the first and second demateable connection interfaces. Accordingly, the pass-through fiber 112A of the first indexing module 120A is optically coupled to the pass-through fiber 112S of the final indexing module 120S while another two of the indexed optical fibers of the first indexing module 120A are dropped at the final indexing module 120S.

In the example network 220, the second demateable connection location of the final splitter indexing module 120S is coupled to the input demateable connection interface of the alternative implementation 180' of the first completer module 180. In particular, the input 184 of the alternative first completer module 180' receives the pass-through fiber 112S and one of the indexed fibers of the final indexing module 100S. The alternative first completer module 180' routes both fibers to one or more outputs of the alternative first completer module 180'.

In certain implementations, the second completer module 190 can be optically coupled to the single-fiber demateable connection interface of the first completer module 180 if additional fiber lines are desired (e.g., see FIG. 8). In certain implementations, the second completer module 190 can be optically coupled to the single-fiber demateable connection interfaces of any of the splitter indexing modules 120 within the network 220. Of course, the second completer module 190 also can be coupled to any of the splitter outputs of any of the splitter indexing modules 120 if desired.

Figure 9:
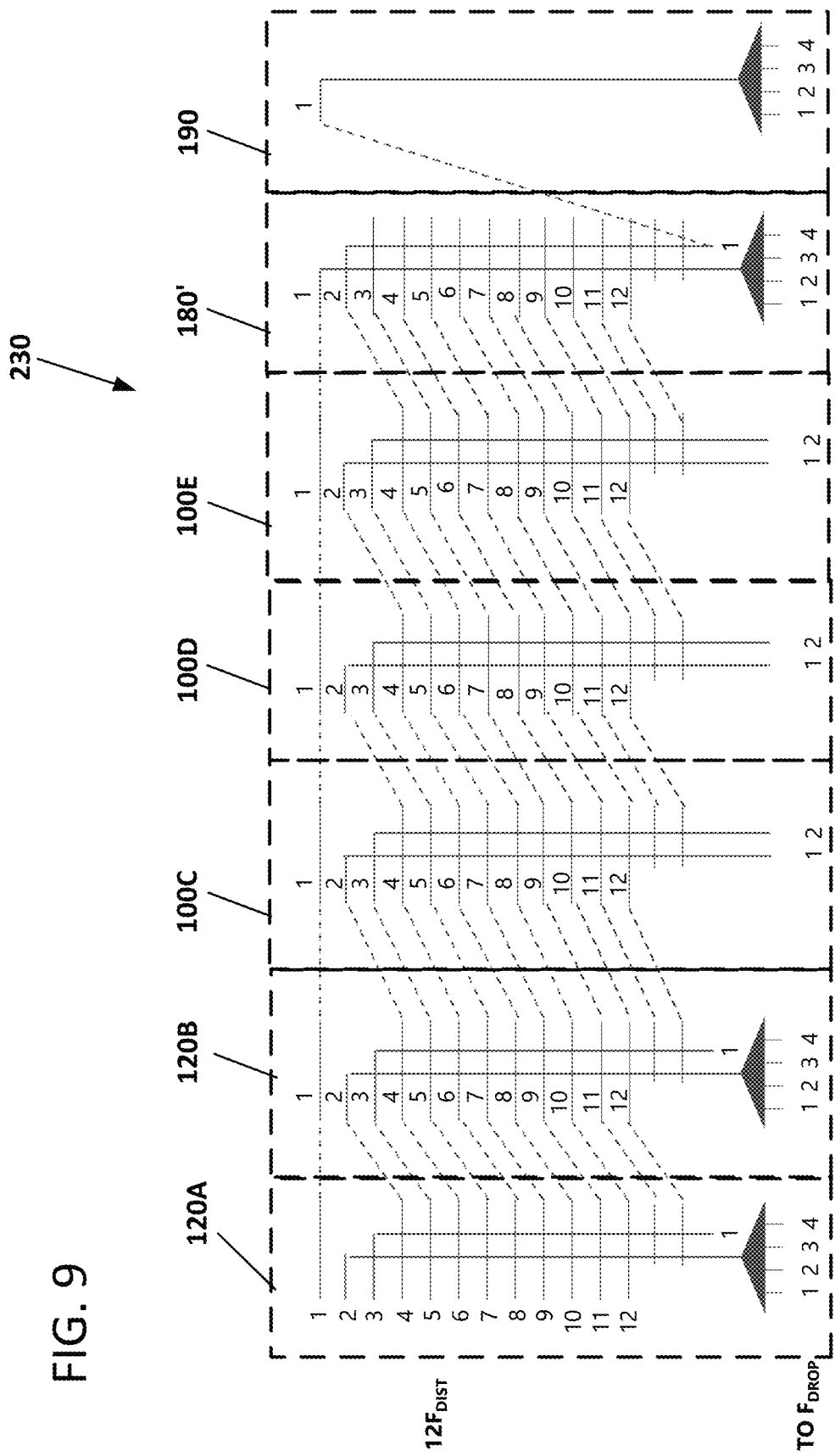
FIG. 9 is a schematic view of a fourth example network formed from a mix of indexing modules of FIG. 1 and splitter indexing modules of FIG. 2.

FIG. 9 illustrates another example network 230 including a chain of indexing splitter type modules 120, indexing modules 100, the alternative first completer module 180', and optionally a second completer module 190. In the example shown, the first and second demateable connection interfaces of the module 100, 120 have a common number of optical fibers. It will be understood, however, that the fiber count can alternatively taper off along the network as shown in network 210 of FIG. 7.

The network 230 includes first and second splitter indexing modules 120A, 120B; third, fourth, and fifth indexing modules 100C, 100D, 100E; a first alternative completer module 180', and optionally a second completer module 190. The pass-through optical fiber 112 of each of the splitter indexing modules 120A, 120B and indexing modules 100C, 100D, 100E are optically coupled together while the remaining fibers are progressively dropped and indexed along the chain. The alternative first completer module 180' receives both the pass-through fiber and the indexed fiber from the fifth indexing module 100E and routes both to output demateable connection interfaces (e.g., demateable connection interfaces 108, 124). The second completer module 190 may split the optical signals from the unsplit output of the alternative first completer module 180'.

Figure 10:
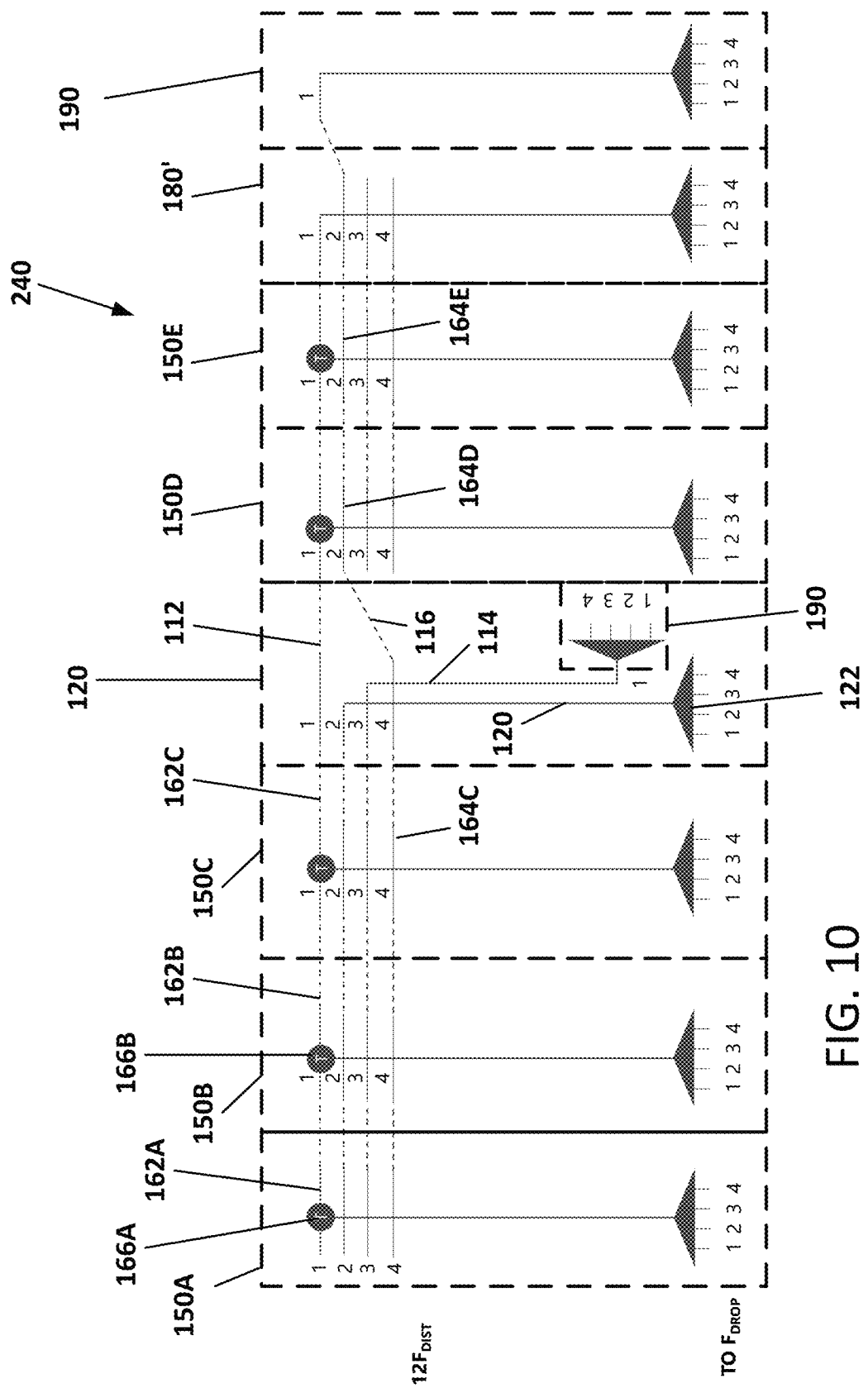
FIG. 10 is a schematic view of a fifth example network formed from a mix of tapping modules of FIG. 3 and a splitter indexing module of FIG. 2.

FIG. 10 illustrates another example network 240 including a chain of tapping modules 150 and a splitter indexing module 120. In the depicted example, the network 240 also includes an alternative first completer module 180' and optionally one or more second completer modules 190. Tapping modules 150A, 150B, 150C, 150D, 150E are arranged in a chain so that the tapped optical fibers 162A, 162B, 162C, 162D, 162E are optically coupled to each other to form a common tapping line. For example, the tapped optical fiber 162A of the first tapping module 150A is optically coupled to the tapped optical fiber 162B of the second tapping module 150B and is optically coupled to the tapped optical fiber 162E of the fifth tapping module 150E.

In the depicted example, the splitter indexing module 120 is disposed between the third and fourth tapping modules 150C, 150D. However, it will be understood that the splitter indexing module 120 can be disposed at any point along the chain where a previously unsplit optical signal is to be accessed. In other implementations, an indexing module 100 can be used instead of the splitter indexing module if only unsplit optical signals are desired at the selected network point.

The pass-through fiber 112 of the splitter indexing module 120 is optically coupled to the common tapping line of the network 240. For example, the pass-through fiber 112 is optically coupled to the tapped optical fiber 162C of the previous tapping module 150C and to the tapped optical fiber 162D of the subsequent tapping module 150D. The drop fibers 114, 120 of the splitter indexing module 120 are optically coupled to some of the pass-through fibers 164C of the previous tapping module 150C and to some of the pass-through fibers 164D of the subsequent tapping module 150D. The indexed optical fiber 116 of the splitter indexing module 120 is optically coupled to the remaining pass-through fiber 164C of the previous tapping module 150C and one of the pass-through fibers 164D of the subsequent tapping module 150D. Accordingly, the splitter indexing module 120 passes through the network line carrying the reduced power optical signals, while dropping network lines that carry unsplit optical signals.

In certain examples, the alternative first completer module 180' is disposed at the end of the chain—after the fifth tapping module 150E. One of the optical fibers received at the input of the completer module 180' is routed to a splitter while the other of the optical fibers is routed to a single-fiber output. The number of tapping modules 150 that can be used within a network chain depends on the percentage of power removed from the tapped optical fiber 162 at each tapping module 150. The first completer module 180, 180' is coupled the chain when the tapped optical fiber line has sufficient optical power for only one drop location (e.g., one subscriber or one splitter input).

In certain examples, a second completer module 190 can be coupled to the single-fiber output of the completer module 180'. In other implementations, the single-fiber output can be utilized as a point-to-point connection (e.g., for a small cell network). In certain examples, the unsplit output of the splitter indexing module 120 (or indexing module 100) also can be coupled to one of the second completer modules 190. In other implementations, the unsplit output can be utilized as a point-to-point connection (e.g., for a small cell network).

Figure 11:
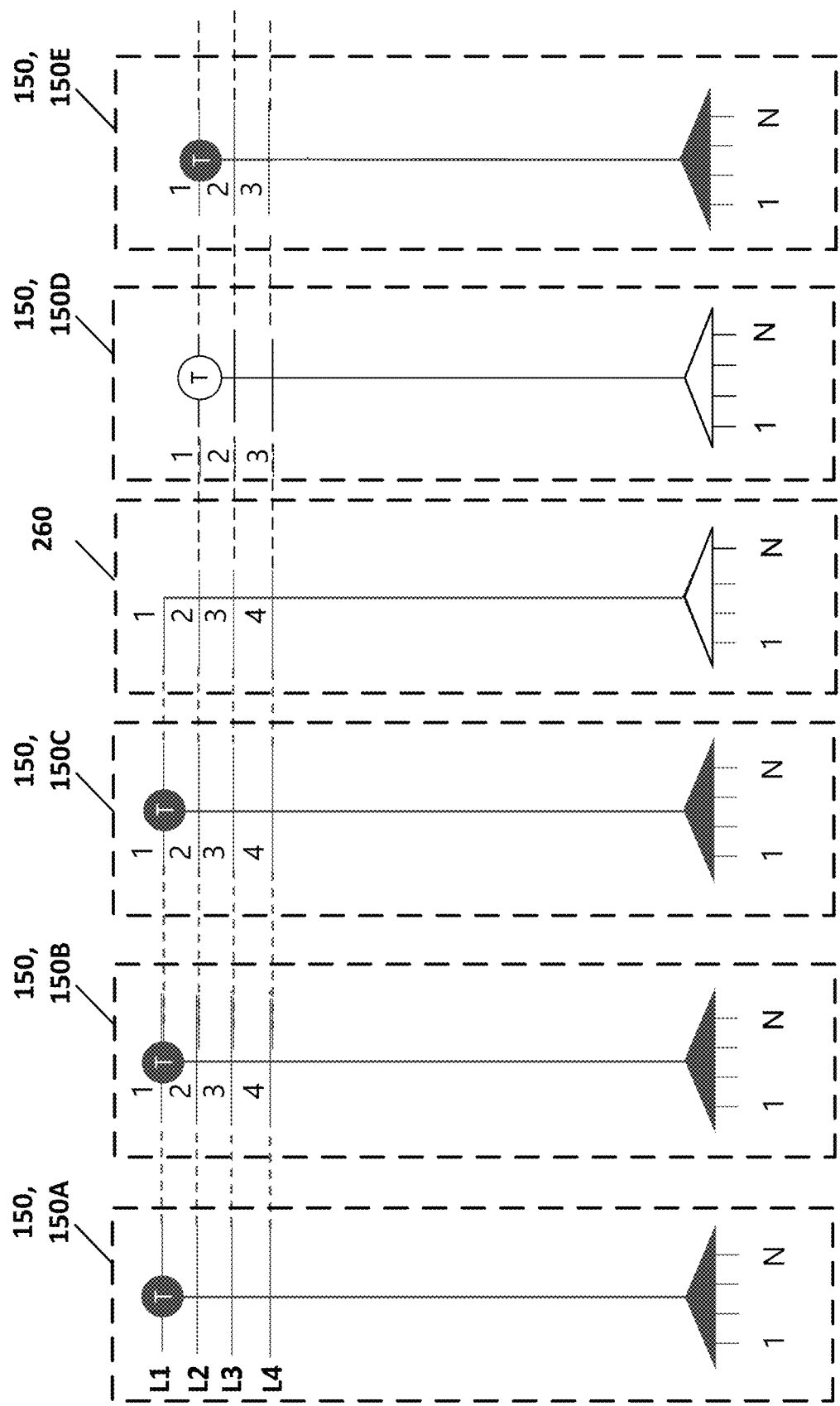
FIG. 11 is a schematic view of a fifth example network including a first chain of tapping modules that tap from a first optical line followed by a second chain of tapping modules that tap from a second optical line that is different than the first optical line.

FIG. 11 illustrates another example network 250 including a first chain of tapping modules 150A-150C that tap from a first optical line L1 followed by a second chain of tapping modules 150D-150E that tap from a second optical line L2 that is different than the first optical line L1. The second optical line L2 is passed through the first chain of tapping modules 150A-150C without being tapped. In certain examples, the second chain of tapping modules 150D-150E is added when the power of the first tapped line L1 can no longer support further tapping. In some such examples, the first optical line L1 is directed to a drop port of a terminal 260 while the other optical lines L2-L4 are passed through via de-mateable connection locations. In other such examples, the first optical line L1 is directed to a power splitter of the terminal 260 while the other optical lines L2-L4 are passed through via de-mateable connection locations. The tapping module 150D of the second chain receives the second optical line L2 of the first chain t the first optical fiber position of the first multi-fiber demateable connection interface 154 of the terminal 150D. In the example shown, the terminals 150D-150E of the second chain pass-through three optical lines. In other examples, however, the terminals 150D-150E may pass through greater or fewer optical lines (e.g., if additional lines are added to the second chain or if additional lines are dropped before reaching the second chain). Additional modules (e.g., additional tapping modules 150, completer modules 180, 190, etc.) can be added to the second chain.

Figure 12:
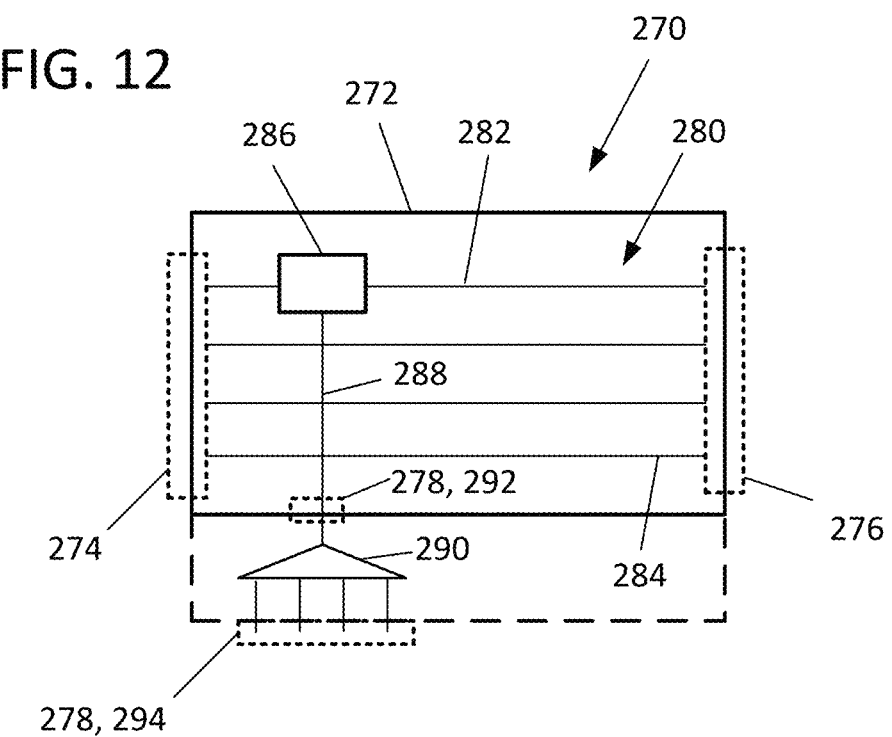
FIG. 12 illustrates an example filter module for use in the optical network, the tapping module including a tapped optical fiber and one or more pass-through fibers.

FIG. 12 illustrates an example filter module 270 including internal fiber circuitry 280. The internal fiber circuitry 280 includes a tapped fiber 282 that extends between corresponding fiber positions (e.g., the first fiber positions) of the first and second multi-fiber demateable connection interfaces 274, 276. The internal fiber circuitry 280 also includes one or more pass-through fibers 284 that extends between the other (e.g., subsequent) fiber positions of the first and second multi-fiber demateable connection interfaces 274, 276.

The internal fiber circuitry 280 also includes a bandpass filter 286 that splits select wavelength groups of optical signals carried over the tapped fiber 282 onto an output fiber 288 that is optically coupled to the third demateable connection interface 278. All of the pass-through fiber 284 bypass the bandpass filter 286 so that no optical signal wavelengths are split from any of the pass-through fibers 284 between the first and second multi-fiber demateable connection interfaces 274, 276.

In some implementations, the demateable connection interface 278 is a single-fiber demateable connection interface 292 that directly receives the output fiber 288. In other implementations, the filter module 270 also includes a demultiplexer or filter 290 within the housing 272. In such examples, the output fiber 288 is routed to an input of the demultiplexer or filter 290. The demultiplexer or filter 290 separates the filtered band of wavelengths into individual wavelengths within the band or smaller groups of wavelengths within the band. Outputs of the demultiplexer or filter 290 are routed to one or more demateable connection interfaces 278. For example, the demateable connection interface 278 can be a multi-fiber demateable connection interface 294 that receives two or more of the splitter outputs. In the depicted example, all of the splitter outputs are routed to the demateable connection interface 294.

In certain implementations, each filter module 270 within a network is configured so that the filtered fiber 282 is disposed at a common position at the first and second multi-fiber demateable connection interfaces 274, 276. Accordingly, when two or more of the filter modules 270 are optically coupled together end-to-end (i.e., the first multi-fiber demateable connection interface 274 of a filter module 270 is optically coupled to the second multi-fiber demateable connection interface 276 of another filter module 270), the filtered fibers 282 all optically couple together along a common tap line (e.g., see line 1 of the network 300 of FIG. 13).

In some implementations, the filter modules 270 may include multiple filtered fibers. In such implementations, however, the indexing modules 100 and splitter indexing modules 120 of the same system must have multiple pass-through fibers that correspond with the sequential fiber positions of the filtered fibers. Accordingly, the filtered modules 270, indexing modules 100, and splitter indexing modules 120 can be used in any desired configuration within a network without unintentionally dropping the filtered fiber lines (i.e., the lines carrying the optical signals of various wavelengths).

Figure 13:
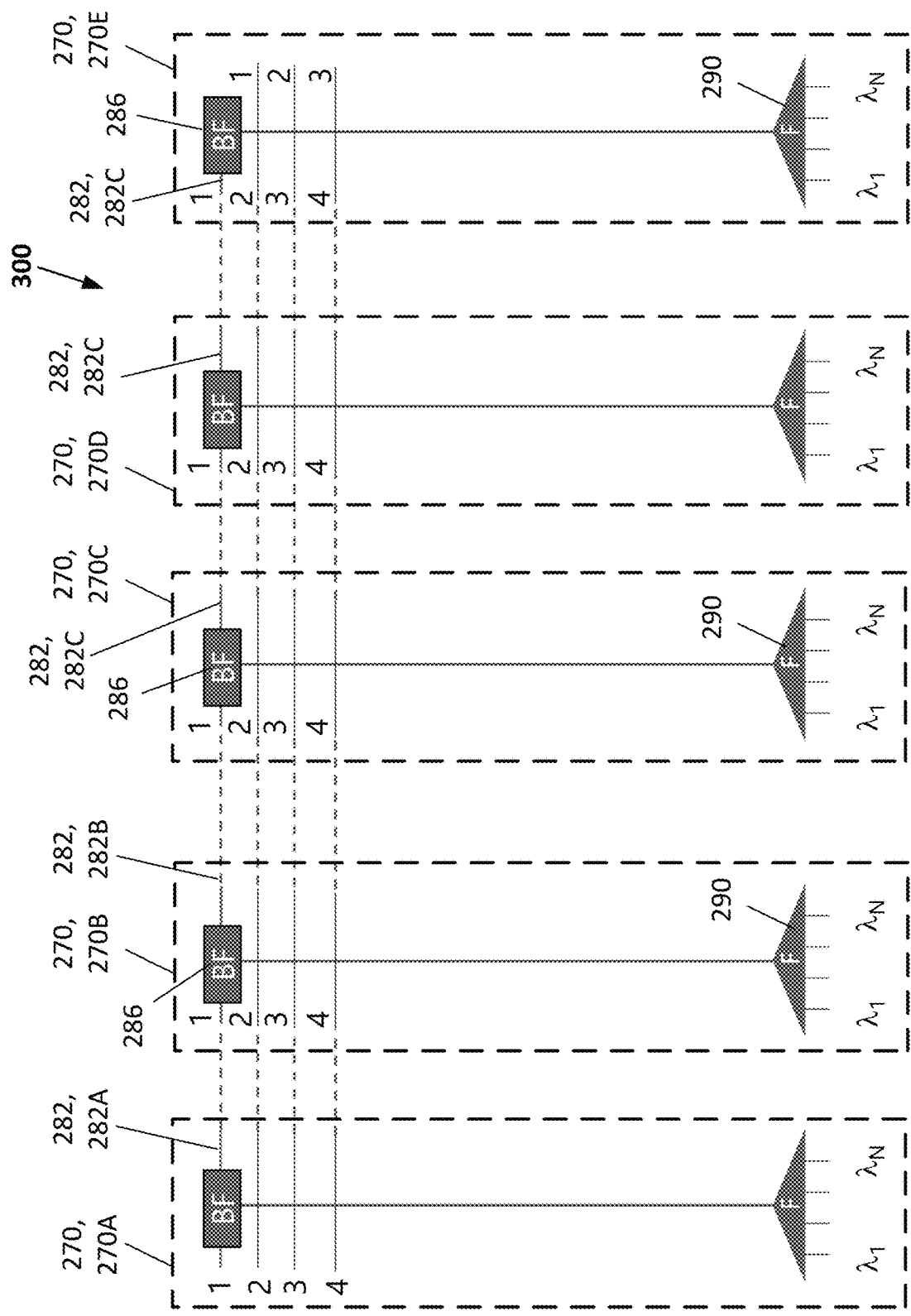
FIG. 13 illustrates another example network including a chain of filter modules for distributing optical signals split based on wavelength.

FIG. 13 illustrates another example network 300 including a chain of filter modules 270 for distributing optical signals split based on wavelength. Filter modules 270A, 270B, 270C, 270D, 270E are arranged in a chain so that the filtered optical fibers 282A, 282B, 282C, 282D, 282E are optically coupled to each other to form a common filtering line. For example, the filtered optical fiber 282A of the first filter module 270A is optically coupled to the filtered optical fiber 282B of the second filter module 270B and is optically coupled to the filtered optical fiber 282E of the fifth filter module 270E. In certain implementations, the bandpass filters 286 of the filter modules 270A-270E differ from each other. For example, the bandpass filter 286 of the first module 270A may filter out a first set of wavelengths while the bandpass filter 286 of the second module 270B filters out a second set of wavelengths that are different than the wavelengths of the first set.

It will be understood that the splitter indexing modules 120 can be disposed at any desired point along the network 300. For example, the splitter indexing module 120 can be cabled between any two of the filter terminals 270 without needing to re-cable the internal fiber circuitry 280 within any of the filter terminals 270 or adjust the connections between any of the other fiber terminals 270 along the network 300. Either of the completer modules 180, 190 disclosed herein can be disposed at the end of the network 300 to complete the first filter line. In some implementations, the remaining optical lines can be used by splitter indexing modules 120 arranged throughout or at the end of the network 300. In other implementations, a remaining optical line can provide a source for a filtered line 282 of another chain of filter modules 270.

Figure 14:
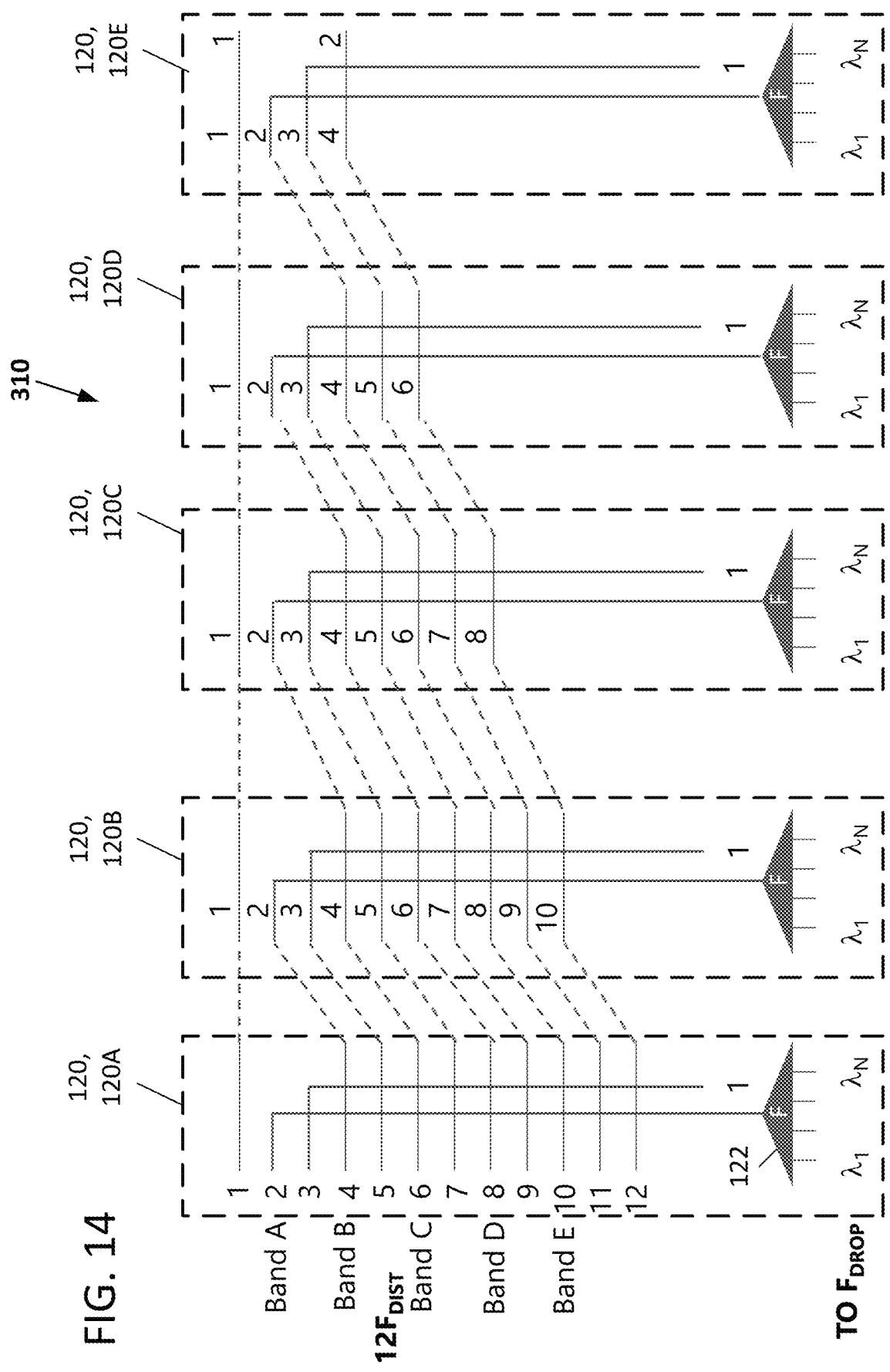
FIG. 14 illustrates another example network including a chain of splitter indexing modules where the splitter is a demultiplexer or other wavelength filter.

FIG. 14 illustrates another example network 310 including a chain of splitter indexing modules 120A-120E where the splitter 122 is a demultiplexer or other wavelength filter. In the example shown, the optical signals are separated by wavelength bands onto different fibers of a cable routed to the input de-mateable connection location of the first splitter indexing module 120A. In the network 310, the separation of the wavelength bands occurs upstream of the illustrated chain (e.g., at a fiber distribution hub). In FIG. 14, each of the splitter indexing modules 120A-120E maintains a common pass-through line (e.g. the fiber at position 1 of the input de-mateable connection location) from which optical signals can be tapped. In some examples, tapping modules 150 can be disposed between any of the splitter indexing modules 120. Alternatively, the pass-through fiber may carry all of the optical wavelength bands and serve as a feeder fiber for the network chain 300 shown in FIG. 13.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An optical network comprising:
 a tap module including a tapped line and a plurality of pass-through lines accessible at an output of the tap module, the tapped line being optically tapped at an optical tap within the tap module to split some of the optical signals carried over the tapped line to a tap output line, the pass-through lines bypassing the optical tap so that no optical signals are split from any of the pass-through lines within the tap module; and
 an indexing module optically coupled to the tap module, the indexing module including a pass-through line, a drop line, and an indexed line, the pass-through line being optically coupled to the tapped line of the tap module, and the indexed line being optically coupled to one of the pass-through lines of the tap module.

2. The optical network of claim 1, wherein the drop line of the indexing module is optically coupled to another of the pass-through lines of the tap module.

3. The optical network of claim 1, wherein the tap module is a first tap module of a plurality of tap modules optically coupled together, each of the tap modules including a respective tapped line and a respective plurality of pass-through lines, the tapped lines of each of the tap modules being optically coupled together, and the pass-through lines of the tap modules being optically coupled together.

4. The optical network of claim 1, wherein the indexing module is a first indexing module of a plurality of indexing modules optically coupled together, each of the indexing modules including a respective pass-through line, a respective drop line, and a respective indexed line, each of the pass-through lines being optically coupled to each other and to the tapped line of the tap module.

5. The optical network of claim 4, wherein the first indexing module includes an optical power splitter that receives the drop line at an input and outputs a plurality of optical fibers to at least one demateable connection interface carried by the first indexing module.

6. The optical network of claim 5, wherein the first indexing module also includes a second drop line that bypasses the optical power splitter.

* * * * *